(No Model.) 2 Sheets—Sheet 1.
E. M. BENTLEY.
CLOSED CONDUIT ELECTRIC RAILWAY.
No. 535,345. Patented Mar. 12, 1895.
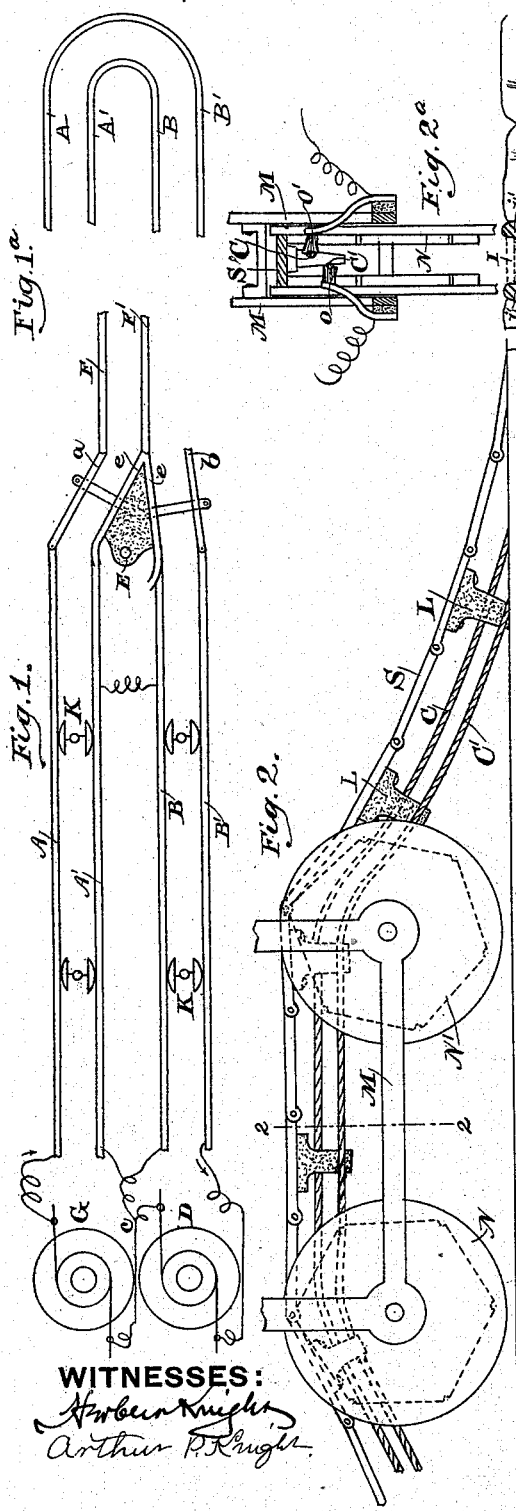
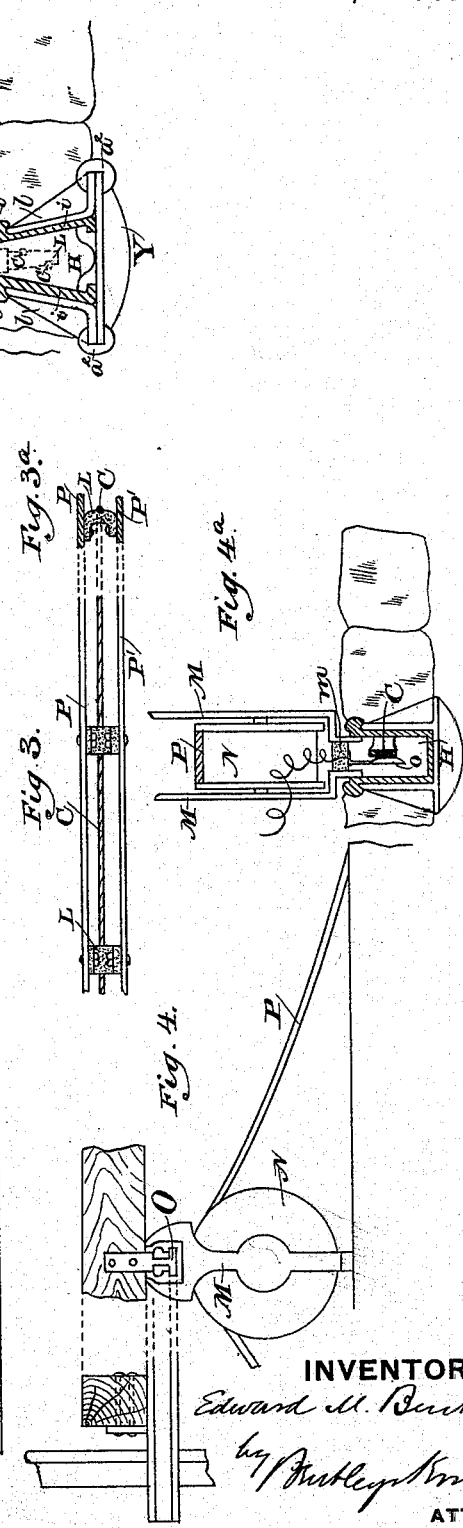
WITNESSES:
INVENTOR:
Edward M. Bentley
ATTYS.

(No Model.) 2 Sheets—Sheet 2.
E. M. BENTLEY.
CLOSED CONDUIT ELECTRIC RAILWAY.
No. 535,345. Patented Mar. 12, 1895.
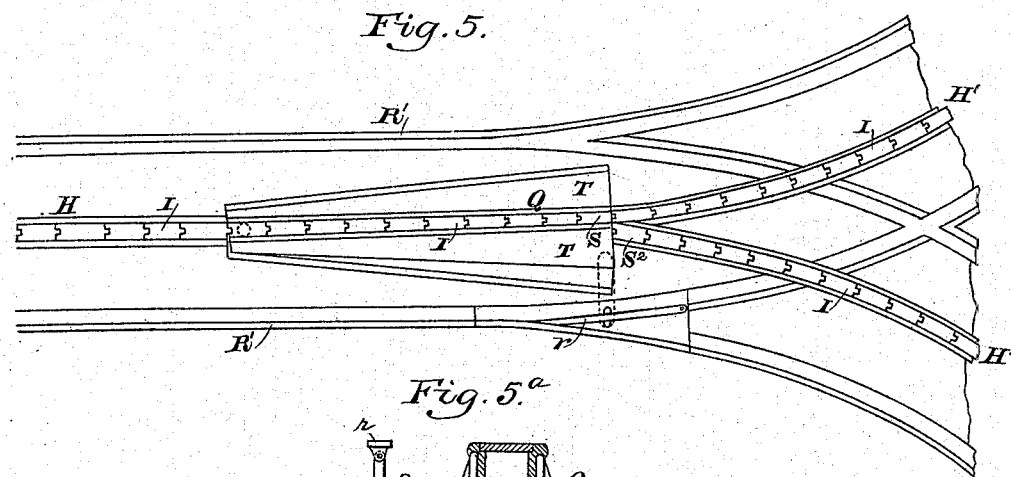
Fig. 5.
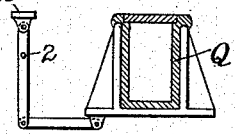
Fig. 5.ª
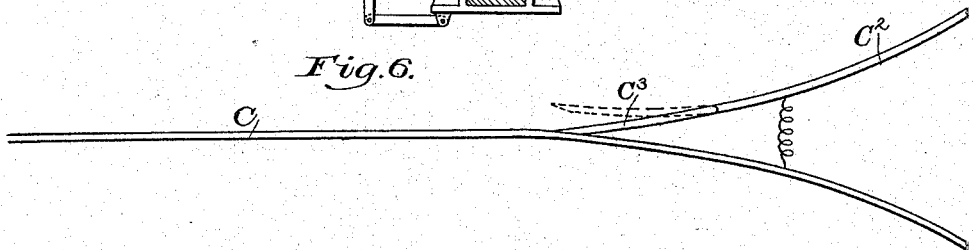
Fig. 6.
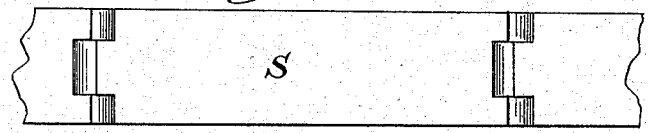
Fig. 7.
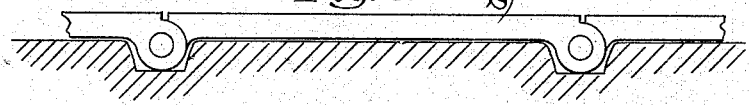
Fig. 8.
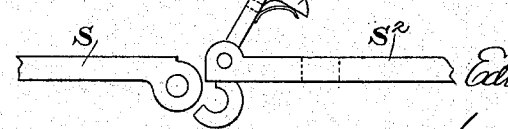
Fig. 9.
WITNESSES:
INVENTOR:
Edward M. Bentley
by Bentley & Knight
ATTYS.

UNITED STATES PATENT OFFICE.

EDWARD M. BENTLEY, OF BOSTON, MASSACHUSETTS.

CLOSED-CONDUIT ELECTRIC RAILWAY.

SPECIFICATION forming part of Letters Patent No. 535,345, dated March 12, 1895.

Original application filed December 11, 1885, Serial No. 185,411. Divided and this application filed February 26, 1891. Serial No. 382,810. (No model.)

*To all whom it may concern:*

Be it known that I, EDWARD M. BENTLEY, a citizen of the United States, residing at Boston, in the county of Suffolk and State of Massachusetts, have invented a certain new and useful Improvement in Electric Railways, of which the following is a specification, this application being a division of my application, Serial No. 185,411, filed December 11, 1885.

My invention consists in a novel device for maintaining the electric connection between a locomotive on the road and a normally closed supply conductor.

The invention is illustrated in the accompanying drawings, wherein—

Figure 1 is a diagram of my system of operating electric railways showing one feature of my invention, and a switching arrangement for connecting either of the tracks of a double track road with a single track extension of the road. Fig. 1ª is a detail view indicating that the two tracks of the double track system of Fig. 1 may be connected at the farther end of the line by a loop. Fig. 2 is a side view showing one mode of arranging the supply conductors and the means for making contact with them. Fig. 2ª is a cross section of Fig. 2, taken on the line 2—2 and showing also in cross section a conduit in which the supply conductors are normally inclosed. Fig. 3 is a detail side view of a modified arrangement in which only one conducting cable is employed, the flexible conduit covering strips being adapted to form a second conductor. Fig. 3ª is a cross section of Fig. 3. Fig. 4 is a side view showing still another modification in which the covering of the conduit is flexible as before, but the conductor fixed. Fig. 4ª is an end view of the cover-lifting wheel N seen in Fig. 4, and showing also in section the conduit cover, the conduit and the inclosed supply conductor. Fig. 5 is a plan view of a switching section of the conduit. Fig. 5ª is a sectional view showing means for connecting the switching conduit section with the track switch. Fig. 6 shows the manner in which the supply conductors are arranged at a switch, and Figs. 7, 8 and 9 are details of the conduit cover.

Referring to Fig. 1, A, A', B, B', represent supply conductors for the two branches of an electric railway respectively, and K, K, represents a locomotive making a constant connection with the said conductors as they travel over the line. G and D are two generators, preferably situated at the same central station. These generators are connected in series through terminals leading to conductors A, B' respectively, while at an intermediate point c a connection is made with both conductors A', B. The two branches of the road being one the direct track and the other the return, they may at their farther end be continued, one into the other as is indicated in Fig. 1ª. In this case no switches are necessary, the two tracks being directly connected together as shown. More commonly, however, a switch will be employed as is shown in Fig. 1 to lead the locomotives from either track on to a single common track F, F'. For this purpose there will be pivoted at the junction of A', B a common conductor switch point E, the movable sections a, b of A, B' respectively being connected to E so as to be movable simultaneously therewith. By this arrangement as the switch point is turned in one direction or the other the sections a, e or the sections e, b are, as the case may be, brought into alignment with the common conductors F, F', and the locomotives may be transferred from the single track to either one of the double tracks, or vice versa. The track switch and the slot switch, if a conduit is used, may be of ordinary construction. The locomotives making contact with A, A' and B, B' respectively when the resistance of the two branches is balanced will be in series, while any excess of current on one branch or in the other will pass back to the corresponding generator by the intermediate conductor, as will be readily understood from kindred systems of distribution now well known.

Referring now to the remaining figures H represents a conduit having an opening at the top somewhat wider than the slot usually provided. It is constructed of two side pieces $i$ of iron which are rolled with an overhanging lip $i'$ on the outside edge, and secured at their lower edges to a yoke Y. Angle braces $l$ engage with the lips $i'$ and are held at the base by clamps $a^2$ adapted to be driven on the end of yoke Y, a rabbet on the upper edges of $i, i$ receiving the cover I. This cover is flexible and is adapted to be removed from the conduit by means of one or more pulleys attached to a traveling vehicle on the road. The cover may be made of blocks S, S hinged together as shown in Fig. 2, and in detail Figs. 7, 8, and 9. When so constructed its seat in the conduit may be provided with notches which receive the hinges and prevent end movement of the cover. Instead of the link cover described, a strip of steel may be used, as shown in Figs. 3 and 4. To the under side of this cover is attached one or more flexible conductors C, C' by means of insulators L. This is shown in Fig. 2 which gives both a side elevation, and a section on line 2, 2 of the elevation.

M is a frame depending from a locomotive and affording bearings for one or more pulleys N, N'. This frame is shown in Fig. 4 as hung from a transverse guide O, and adapted to slide thereon. The conduit being in the middle of the track, and the guide extending beyond the wheels the frame can slide clear to the end, and in case of accident, as derailment of the car, it will drop off the guide without injury. The peripheries of N, N' are adapted to receive the flexible cover and the attached conductors so that as a locomotive proceeds it will be continually lifted from its place, and after passing over the pulleys be laid down again to its seat. The distance which the cover is lifted is comparatively slight and is readily permitted by its flexibility and looseness of the joints.

There are fastened upon M two contact brushes $o, o'$ shown in the section, Fig. $2^a$, which bear upon C, C' respectively as they pass along over the pulleys, and conduct the current to the propelling motor of the locomotive. The motor is thus constantly in circuit with the supply conductors C, C' which in turn are in connection with the source of electricity at the generating station.

Fig. 3 shows an elevation and section of two steel strips P, P' supporting a single conductor C between them on insulators L, the strip P serving as a flexible cover. In this case the return conductor is the two flexible strips, and the iron of the conduit itself which is in connection with them. The track rails may also be connected to them to still further reduce the resistance.

In Fig. 4 the cover P alone is lifted by the pulleys and the conductor C is stationary, the contact being maintained in this arrangement by the shoe $o$ which is supported on an insulating piece $m$ on the frame below pulley N, as seen in the sectional view at the right.

Figs. 5 and 6 illustrate the devices for switching in a road of the kind just described. A section Q of the conduit is made movable about a center so as to lead from main conduit H to either one of the branch conduits H', $H^2$. A corresponding section of cover I is adapted to move with it and to be connected with either one of the branch covers by means of the coupling shown in Fig. 9, in which R is a lever pivoted to $S^2$ and having a hook at its outer end adapted to engage with a pivot at the end of S. This lever is locked in position by the spring latch S', and when so locked the coupling makes a hinge connection between H, H', or $H^2$ so that it is practically continuous from the main into either branch. On each side of Q are the wings T, T which serve as covers for the space in which the conduit moves. It is independent of the track rails R', R' being included in the space between them. A switch point $r$ serves to direct the locomotive in a well known manner. The switch point may be connected with the conduit, so as to move simultaneously therewith, as is further shown in Fig. $5^a$ where 1 is a cover pivoted at 2 but connected at its opposite ends to the track switch and swinging conduit section. Within the conduit the conductor is fixed, though the conduit itself at that point is movable, as described, but one branch of the conductor as $C^2$ has a movable section $C^3$ which may be turned as indicated by the dotted lines, Fig. 6, so as to allow the contact $o$ to pass along C.

What I claim as new, and desire to secure by Letters Patent, is—

1. The combination with conductor F of a single track electric railway, of a double track road arranged so that the single and double tracks run into one another, and provided with continuous conductors for each of the double tracks, and a movable conductor section in each of the branches of the double track portion of the railway adapted to alternately form a continuation of F whereby locomotives may pass from the single to either of the double tracks, and vice versa.

2. The combination with a flexible conduit cover, of actuating devices for moving the cover so as to clear the slot connected to a vehicle, and movable transversely to said vehicle.

3. The combination with a flexible conduit cover, of a lifting pulley therefor, connected to a traveling vehicle, and movable transversely relatively to said vehicle.

4. The combination of a conduit extending along an electric railway, an insulated conductor therein, a flexible cover for said conduit, a lifting device for said cover, and a contact device connected to a vehicle on the railway and adapted to make contact with said conductor beneath the cover as it is raised by the lifting device.

5. The combination of a conduit along an electric railway, an insulated conductor therein, and a flexible cover normally closing the opening into the conduit, with a slot opening device connected with a vehicle traveling over the railway, and a contact engaging the conductor for completing the motor circuit, as set forth.

6. The combination with a conduit and flexible conduit cover, of an insulated conductor suspended from the cover.

7. The combination with a conduit and flexible cover of a lifting device for the conduit cover connected to a traveling vehicle and a guide on the vehicle on which the lifting device slides.

8. The combination with a branching railway track, of a conduit along the main, and along each branch track, and a movable conduit section at the branching point independent of the track rails.

9. The combination in a branching electric railway of a conduit and an inclosed conductor in the main, and along each branch track, a section of said conduit being movable at the branching point and the conductor inclosed therein being stationary.

10. The combination with a movable conduit section at the branching point of an electric railway, of the track switching point connected thereto so as to be movable therewith.

11. The combination with a flexible conduit cover divided into sections, of a detachable coupling between two adjacent sections.

In witness whereof I have hereto set my hand this 20th day of February, 1891.

EDWARD M. BENTLEY.

Witnesses:
HERBERT KNIGHT,
ARTHUR P. KNIGHT.